(12) United States Patent
Loret de Mola

(10) Patent No.: US 8,777,193 B2
(45) Date of Patent: *Jul. 15, 2014

(54) VIBRATION ISOLATION FASTENER INSERT

(71) Applicants: The Young Engineers, Inc., Lake Forest, CA (US); Applied Concepts Aircraft Solutions, Inc., Stuart, FL (US)

(72) Inventor: Manuel Loret de Mola, Jupiter, FL (US)

(73) Assignees: The Young Engineers, Inc., Lake Forest, CA (US); Manuel Loret de Mola, Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/744,822

(22) Filed: Jan. 18, 2013

(65) Prior Publication Data

US 2013/0168908 A1  Jul. 4, 2013

Related U.S. Application Data

(63) Continuation of application No. 12/286,972, filed on Oct. 4, 2008, now Pat. No. 8,393,601.

(51) Int. Cl.
  *F16F 7/00* (2006.01)
  *F16F 1/38* (2006.01)
  *F16B 5/02* (2006.01)
  *F16B 5/01* (2006.01)

(52) U.S. Cl.
  CPC ............... *F16F 7/00* (2013.01); *F16F 1/3863* (2013.01); *F16B 5/0258* (2013.01); *F16B 5/01* (2013.01)
  USPC ........................................ 267/141.5; 403/226

(58) Field of Classification Search
  USPC ................. 403/203, 221, 223, 225, 226, 228; 244/131; 267/141.2, 141.3, 141.4, 267/141.5; 52/787.1
  See application file for complete search history.

(56) References Cited

U.S. PATENT DOCUMENTS

| | | |
|---|---|---|
| 876,912 A | 1/1908 | Pike |
| 1,295,868 A | 3/1919 | Dodds |
| 1,410,004 A | 3/1922 | Dodds |
| 1,811,736 A | 6/1931 | Van Bezel |
| 1,864,080 A | 6/1932 | Madge |
| 1,964,432 A | 6/1934 | Geyer |
| 2,429,103 A | 10/1947 | Mitchell |
| 2,538,658 A | 1/1951 | Saurer |
| 2,631,048 A | 3/1953 | Palmer |
| 2,880,830 A | 4/1959 | Rohe |
| 2,926,881 A | 3/1960 | Painter |
| 2,929,426 A | 3/1960 | Hamman |
| 3,009,746 A | 11/1961 | Haushalter |
| 3,058,765 A | 10/1962 | Thomas |
| 3,137,887 A | 6/1964 | Mannino et al. |
| 3,181,850 A | 5/1965 | Bajer |
| 3,262,480 A | 7/1966 | Storch |
| 3,265,107 A | 8/1966 | Glicksman |
| 3,282,015 A | 11/1966 | Rohe et al. |

(Continued)

*Primary Examiner* — Michael P Ferguson
(74) *Attorney, Agent, or Firm* — Joseph E. Mueth

(57) ABSTRACT

A vibration isolation fastener insert comprising: a rigid cylindrical hub having an externally extending flange and a through longitudinal opening to receive a fastener. An elastomeric bushing around the hub has a slot therein receiving the external flange. An upper housing is disposed around the side of the bushing and has a flange over the top of the bushing. A lower housing is disposed around the external side of the upper housing and has a flange extending below a lower surface of the bushing.

4 Claims, 5 Drawing Sheets

(56) References Cited

U.S. PATENT DOCUMENTS

| | | | |
|---|---|---|---|
| 3,289,724 | A | 12/1966 | Ernest |
| 3,339,609 | A | 9/1967 | Cushman |
| 3,388,627 | A | 6/1968 | Tinnerman |
| 3,429,598 | A | 2/1969 | Scheublein et al. |
| 3,434,261 | A | 3/1969 | Rohe |
| 3,468,212 | A | 9/1969 | Tinnerman |
| 3,520,342 | A | 7/1970 | Scheffer |
| 3,635,272 | A | 1/1972 | Scheffer |
| 3,742,808 | A | 7/1973 | Trembley |
| 3,912,206 | A | 10/1975 | Jong |
| 3,964,531 | A | 6/1976 | Schenk |
| 4,069,864 | A | 1/1978 | Novoryta et al. |
| 4,092,078 | A | 5/1978 | Klotz et al. |
| 4,126,170 | A | 11/1978 | DeHaitre |
| 4,196,775 | A | 4/1980 | Groh |
| 4,248,285 | A | 2/1981 | Flaig |
| 4,509,308 | A | 4/1985 | Dettfurth et al. |
| 4,530,491 | A | 7/1985 | Bucksbee et al. |
| 4,577,450 | A | 3/1986 | Large |
| 4,679,958 | A | 7/1987 | Mizusawa et al. |
| 4,689,928 | A | 9/1987 | Dutton et al. |
| 4,725,159 | A | 2/1988 | Wood, Jr. |
| 4,761,860 | A | 8/1988 | Krauss |
| 4,812,193 | A | 3/1989 | Gauron |
| 4,817,264 | A | 4/1989 | Worthing |
| 4,846,612 | A | 7/1989 | Worthing |
| 4,863,326 | A * | 9/1989 | Vickers ............... 411/105 |
| 4,872,903 | A | 10/1989 | Periou |
| 4,880,343 | A | 11/1989 | Matsumoto |
| 4,973,208 | A | 11/1990 | Gauron |
| 4,981,735 | A | 1/1991 | Rickson |
| 5,069,431 | A | 12/1991 | Kakimoto et al. |
| 5,082,405 | A * | 1/1992 | Witten ............... 411/82 |
| 5,092,550 | A | 3/1992 | Bettini |
| 5,141,203 | A | 8/1992 | Baker et al. |
| 5,143,456 | A | 9/1992 | Jordens et al. |
| 5,154,530 | A | 10/1992 | Dresselhouse |
| 5,158,269 | A | 10/1992 | Hein et al. |
| 5,230,580 | A | 7/1993 | Henkel |
| 5,248,134 | A | 9/1993 | Ferguson et al. |
| 5,261,748 | A | 11/1993 | Kameda |
| 5,295,671 | A | 3/1994 | Nakagaki et al. |
| 5,378,099 | A | 1/1995 | Gauron |
| 5,540,514 | A | 7/1996 | Demars et al. |
| 5,632,582 | A | 5/1997 | Gauron |
| 5,655,758 | A | 8/1997 | Hadano et al. |
| 5,713,706 | A | 2/1998 | Lozano |
| 5,746,411 | A | 5/1998 | Bruas et al. |
| 5,779,413 | A | 7/1998 | Cosenza |
| 5,860,779 | A | 1/1999 | Toosky et al. |
| 5,876,023 | A | 3/1999 | Hain et al. |
| 5,876,024 | A | 3/1999 | Hain |
| 6,065,742 | A | 5/2000 | Whiteford |
| 6,102,610 | A | 8/2000 | Palusis et al. |
| 6,138,980 | A | 10/2000 | Farbotnik |
| 6,216,833 | B1 | 4/2001 | Lefferts et al. |
| 6,227,751 | B1 | 5/2001 | Kemmer et al. |
| 6,264,412 | B1 | 7/2001 | Nakamura et al. |
| 6,328,513 | B1 | 12/2001 | Niwa et al. |
| 6,343,889 | B1 | 2/2002 | Hendricks et al. |
| 6,382,865 | B1 | 5/2002 | Paxman |
| 6,394,432 | B1 | 5/2002 | Whiteford |
| 6,443,679 | B1 | 9/2002 | Schwarz |
| 6,481,943 | B2 | 11/2002 | Coudrais et al. |
| 6,588,820 | B2 | 7/2003 | Rice |
| 6,601,818 | B1 | 8/2003 | Larsen |
| 6,695,295 | B2 | 2/2004 | Williams |
| 6,715,746 | B2 | 4/2004 | Bachmeyer et al. |
| 6,748,820 | B2 | 6/2004 | Ruhlander |
| 6,789,993 | B2 | 9/2004 | Ozawa et al. |
| 6,910,670 | B2 | 6/2005 | Kato |
| 7,048,487 | B2 | 5/2006 | Stone |
| 7,052,002 | B2 | 5/2006 | Imaeda et al. |
| 7,131,786 | B2 | 11/2006 | Domange et al. |
| 7,163,200 | B2 | 1/2007 | Dickson et al. |
| 7,179,039 | B2 | 2/2007 | Schwartz et al. |
| 7,261,365 | B2 | 8/2007 | Dickson et al. |
| 7,275,347 | B2 | 10/2007 | Hayes |
| 7,465,136 | B2 | 12/2008 | Nagayama |
| 7,802,953 | B2 | 9/2010 | Stephen |
| 7,862,283 | B2 | 1/2011 | Giannakakos et al. |
| 8,393,601 | B2 * | 3/2013 | de Mola ............... 403/226 |
| 2002/0038927 | A1 | 4/2002 | Mayerbock |
| 2002/0056953 | A1 | 5/2002 | Williams |
| 2002/0131815 | A1 | 9/2002 | Bellapart |
| 2004/0265091 | A1 | 12/2004 | Cheung |
| 2006/0137294 | A1 | 6/2006 | Waits Jr. et al. |
| 2007/0297869 | A1 | 12/2007 | Kunda |
| 2010/0008104 | A1 | 1/2010 | Rosenthal |

* cited by examiner

VIBRATION ISOLATION FASTENER INSERT

CROSS-REFERENCE TO RELATED APPLICATIONS

This application is a continuation of pending U.S. patent application Ser. No. 12/286,972 filed Oct. 4, 2008, the disclosures of which are incorporated herein by reference.

BACKGROUND OF THE INVENTION (1). Field of the Invention

This invention relates to a vibration isolation insert device that serves the purpose of dampening vibrations while fastening structures/assemblies together or installing assemblies to a vibrating structure. This insert device can be installed on a monument, assembly, panel, plate or in a composite panel to assemble or install a component part on an aircraft, moving vehicle, or vibrating structure.

The effects of vibrations are a problem in commercial aircraft. For example, vibration is transmitted by the structural beams which support the floor panels. These floor panels are typically made of an aluminum honeycomb, or other rigid, lightweight material and vibration causes the panels to vibrate which creates sound. This background sound can be unpleasant and interfere with ordinary conversation, disturb sleep and the like. Other structures or monuments normally found in aircraft interiors such as seats, galleys, bulkheads, etc. supported by the base airframe structure are also subject to vibration and the creation of unwanted sound and noise.

All of the effects are undesirable and reduce the flying customer's comfort and satisfaction.

The practice of using isolators on vehicles is longstanding. They are used to reduce noise and eliminate the transfer of isolating frequencies to the passenger cabin, thereby reducing perceived noise and reducing passenger fatigue. It has been common practice to isolate monuments (e.g., furnishings) and/or added components on an aircraft or vehicles with the use of external isolator mounts (i.e., isolating devices mounted to the aircraft or vehicle structure). These isolator mounts generally require additional brackets, fasteners and other adapters in order to make isolation functional in a vibrating environment.

(2). Description of Related Art Including Information Disclosed Under 37 CFR 1.97 and 1.98

U.S. Pat. No. 6,443,679 issued to Schwarz on Sep. 3, 2002 shows a vibration-dampening connecting arrangement for the detachable connection of two components with a releasing part, which can be moved on a bolt guided by a bush. U.S. Pat. No. 7,179,039 issued to Schwartz et al. on Feb. 20, 2007 shows a vibration-damping ring insert arrangement and component connection arrangement incorporating the same. U.S. Pat. No. 5,876,023 issued to Hain et al. on Mar. 2, 1999 and companion U.S. Pat. No. 5,876,024 shows a vibration isolation insert for aircraft floor panels and the like. U.S. Pat. Nos. 6,065,742, 6,138,980, 6,216,833 B1, 6,394,432 B1, 6,715, 746 and Enidine GmbH U.S. Pat. No. 7,131,786 B2 are also patents in this field.

BRIEF SUMMARY OF THE INVENTION

A vibration isolation fastener insert structure adapted to be partially or wholly snugly received in a hole in a panel comprising:

a rigid cylindrical hub having an externally extending flange and a central through longitudinal opening adapted to receive a fastener element;

an elastomeric bushing snugly carried or formed around said hub and having a slot therein receiving said externally projecting flange;

an upper housing;

a lower housing;

the upper housing being disposed around the side of said bushing and having a flange over the top of said bushing and the lower housing disposed around the external side of said upper housing and having a flange extending below a lower surface of said bushing.

A vibration isolation fastener insert structure adapted to be partially or wholly snugly received in a hole in a panel comprising:

a rigid cylindrical hub having an externally extending flange and a central through longitudinal opening adapted to receive a fastener element;

an elastomeric bushing snugly carried or formed around said hub and having a slot therein receiving said externally projecting flange;

an upper housing;

a lower housing;

the upper housing being disposed around the side of said bushing and having a flange over the top of said bushing and the lower housing disposed around the external side of said upper housing and having a flange extending below a lower surface of said bushing, said lower housing being externally threaded.

A panel assembly having a through hole, at least partially snugly received in said hole a vibration isolation fastener insert comprising:

a rigid cylindrical hub having an externally extending flange and a central through longitudinal opening adapted to receive a fastener element;

an elastomeric bushing snugly carried or formed around said hub and having a slot therein receiving said externally projecting flange;

an upper housing;

a lower housing;

the upper housing being disposed around the side of said bushing and having a flange over the top of said bushing and the lower housing disposed around the external side of said upper housing and having a flange extending below a lower surface of said bushing, the upper housing being disposed around the side of said bushing and having a flange over the top of said bushing and the lower housing disposed around the external side of said upper housing and having a flange extending below a lower surface of said bushing, said lower housing being externally threaded.

A panel assembly, said panel having a through hole, and upper and lower flanges, the upper flange having a cylindrical element being snugly received in said through hole and the lower flange having a cylindrical element being threadably received in said upper flange and carrying inwardly projecting threads, a vibration isolation fastener insert structure partially or wholly inserted in said hole in said panel and comprising:

a rigid cylindrical hub having an externally extending flange and a central through longitudinal opening adapted to receive a fastener element;

an elastomeric bushing snugly carried or formed around said hub and having a slot therein receiving said externally projecting flange;

an upper housing;

a lower housing;

the upper housing being disposed around the side of said bushing and having a flange extending over the top of said bushing and the lower housing disposed around the external side of said upper housing and having a flange extending below a lower surface of said bushing, said lower housing being externally threaded,
said external threads on said lower housing being made up with the inwardly projecting threads on said lower flange.

The invention is directed to aircraft having fastener inserts incorporated in a member which can be a honeycomb or composite or metal panel forming composite part of the floor, seat, overhead locker, etc. or sheet metal or plate component to support avionic equipment or the like. This invention can also be applied directly to the airframe metal structure as a swaged insert on to the metal structure in similar manner as to plate or sheet metal.

In one preferred embodiment, a thru hole is cut in the panel, the upper and lower flanges are pressed in and the flanges are also bonded on the skins of the panel with adhesive then potting material is injected to form the "desification".

Separately, the upper and lower housing with the "C" cross-section shaped elastomeric bushing and hub are assembled. An elastomeric spacer ring can be dropped into place if spacing is desired. Then the above described assembly is threaded into place, female threads on the lower housing engaging the inwardly projecting male threads on the lower flange. The assembly can be advanced as desired.

The purpose of the elastomeric bushing is to provide a vibration dampener between the two structural parts. The nut, bolt and seat track do not form part of the invention but do show how the insert is used.

The "potted-in" embodiment is preferred but not a limitation since the fastener inserts can be held in, for example, a metal sheet or directly to the airframe panel by force or interference fit, viz., swaging or bonded-on.

In case of application directly to sheet metal, plate or airframe metal structure, isolator insert will be swaged to metal in similar manner as a rivet or clinch nut.

BRIEF DESCRIPTION OF THE SEVERAL VIEWS OF THE DRAWINGS

The basic design of one embodiment of a panel assembly with the vibration isolation insert in place is as shown in cross-section in FIG. 1.

Figure 1:
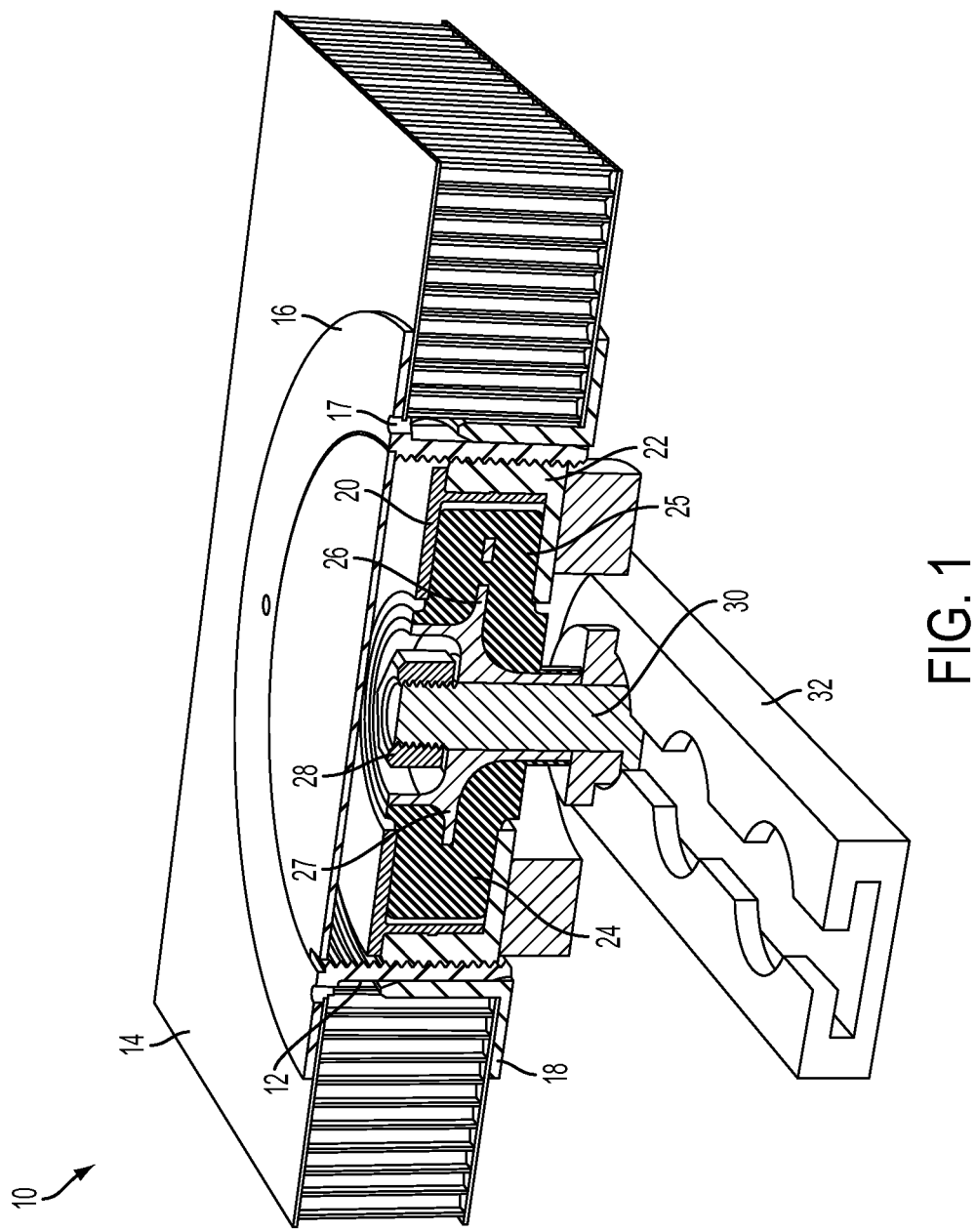
Turning to FIG. 1 in more detail, the insert 10 is adapted to be received in a hole 12 drilled in panel 14, typically a honeycomb panel. In use, the upper and lower flanges 16 and 18 are inserted into hole 12 and held by an interference or press fit, i.e., swaged. Alternatively, the flanges 16 and 18 can be potted in by a liquid potting compound or glue, injected via potting holes 17, which, after injection, hardens and adheres to surfaces of upper flange 16 and lower flange 18 and to exposed cells within the honeycomb panel 14, holding the flanges in place. The flanges are usually bonded on first with an adhesive and then potted-in with a potting compound.

Next, the upper housing 20, lower housing 22 having external male threads, elastomeric bushing 24, hub 26 are pre-assembled with the external flange 27 on hub 26 being received in slot 25 in elastomer bushing 24 and the so sub-assembly threaded into the female threads on upper flange 16. The elastomer can be over-molded onto hub 26 whereby the holes on hub are used for anti-rotation and increased bonding surface for the elastomer. Finally, a nut 28 and bolt 30 are inserted and made up to join the panel 14 to the structural track 32.

Figure 2:
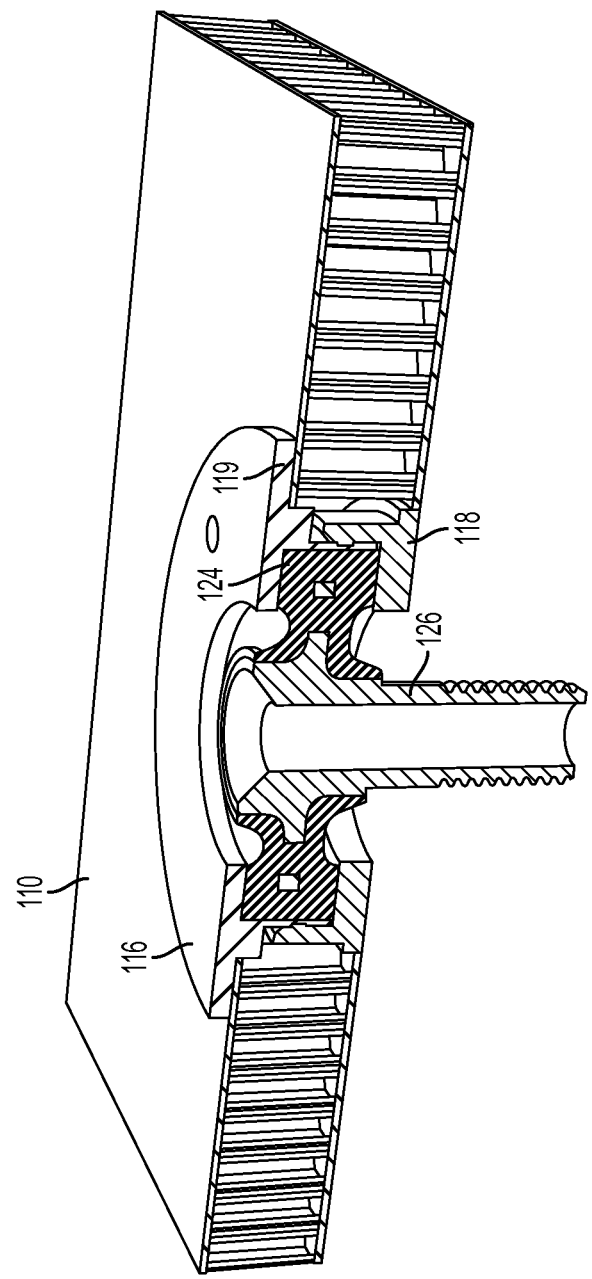
FIG. 2a shows the upper flange in perspective view.
FIG. 2b shows the lower flange in perspective view showing slots which are adapted to engage anti-rotation projections on the bushing.
FIG. 2c shows the bushing in perspective view.
FIG. 2d shows the lower flange in perspective view.
FIG. 2e shows the hub without the bushing, the hub being partially broken away.
Figure 2A:
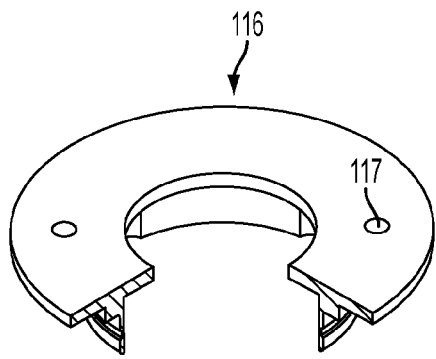
Figure 2B:
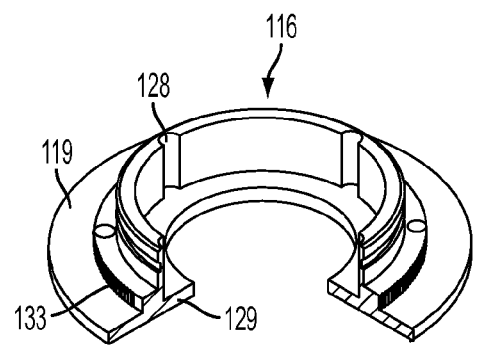
Figure 2C:
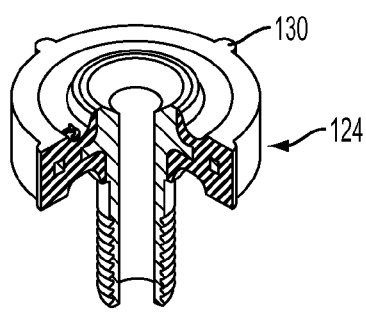
Figure 2D:
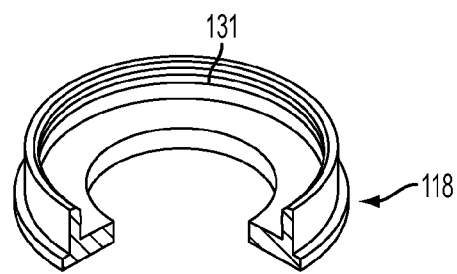
Figure 2E:
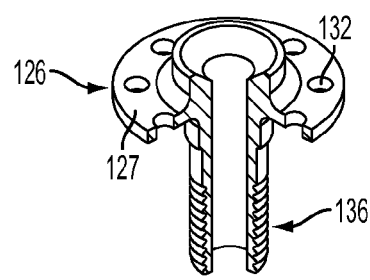

Turning to FIGS. 2a, 2b and 2c of 2, the drawings, in this embodiment the upper flange 116 and the lower flange 118 are press fit, screwed or swaged to each other and capture components. The elastomeric bushing 124 and hub 126 (elastomer/metal hub assembly) are positioned as shown. The dimensions and materials for flange 116 and flange 118 will depend on the type and size of fasteners (e.g., screw, anchor, etc.) used to secure the monument to the vehicle structure and the material into which it will be installed. Flange 116 and flange 118 will accommodate different applications whereby the overlying elements 119 on flanges 116 and 118 may be omitted and the balance of the flanges 116 and 118 are flush with the surface of the panel 110 or may overlap the surface(s) of the panel 110 to increase the strength of the insert under various tensile, shear or torsion loading conditions. The holes 117 are for the injection of potting material and venting of air as potting is carried out.

Hub 126 is to be cylindrical in shape with a circular "T" flange 127 intersecting the cylinder. The flange 127 component on hub 126 are larger than the clearance hole openings on flanges 116 and 118 such that it is retained if pulled axially, even if elastomeric bushing 124 would fail. Hub 126 may be threaded internally to accept any size screw or it can remain unthreaded or through-drilled to act as a bushing, either with/without a countersink on either end to accommodate a flat-head screw. Hub 126 may also be threaded externally at its exposed end to accept adapters of different sizes. The diameter dimensions and finishes of hub 126 may vary to accommodate various size screws, and to accommodate strength requirements.

Elastomeric bushing 124 may have ribs or projections 130 to provide anti-rotation elements which can engage slots 128.

Flange 118 may have a snap ring 131 to facilitate engagement with snap groove 129 on flange 116.

Elastomeric bushing 124 may or may not be bonded to hub 126 such as by molding and will have the required characteristics to provide the optimum dampening under the loads for each condition. Various dampening effects can be achieved by modifying the material characteristics and dimensions of elastomeric bushing 124.

Optionally, flange 116 may have an anti-rotation knurled ring or area 133.

Hub 126 may have holes 132 in flange 127 to allow for over-molding of elastomer and thereby prevent relative rotation. Hub 126 as shown, for example, in FIG. 2c may have self-locking internal threads. The external threads may also be self-locking. Hub 126 may also be double ended, that is, have a flange at both of its ends.

Figure 3:
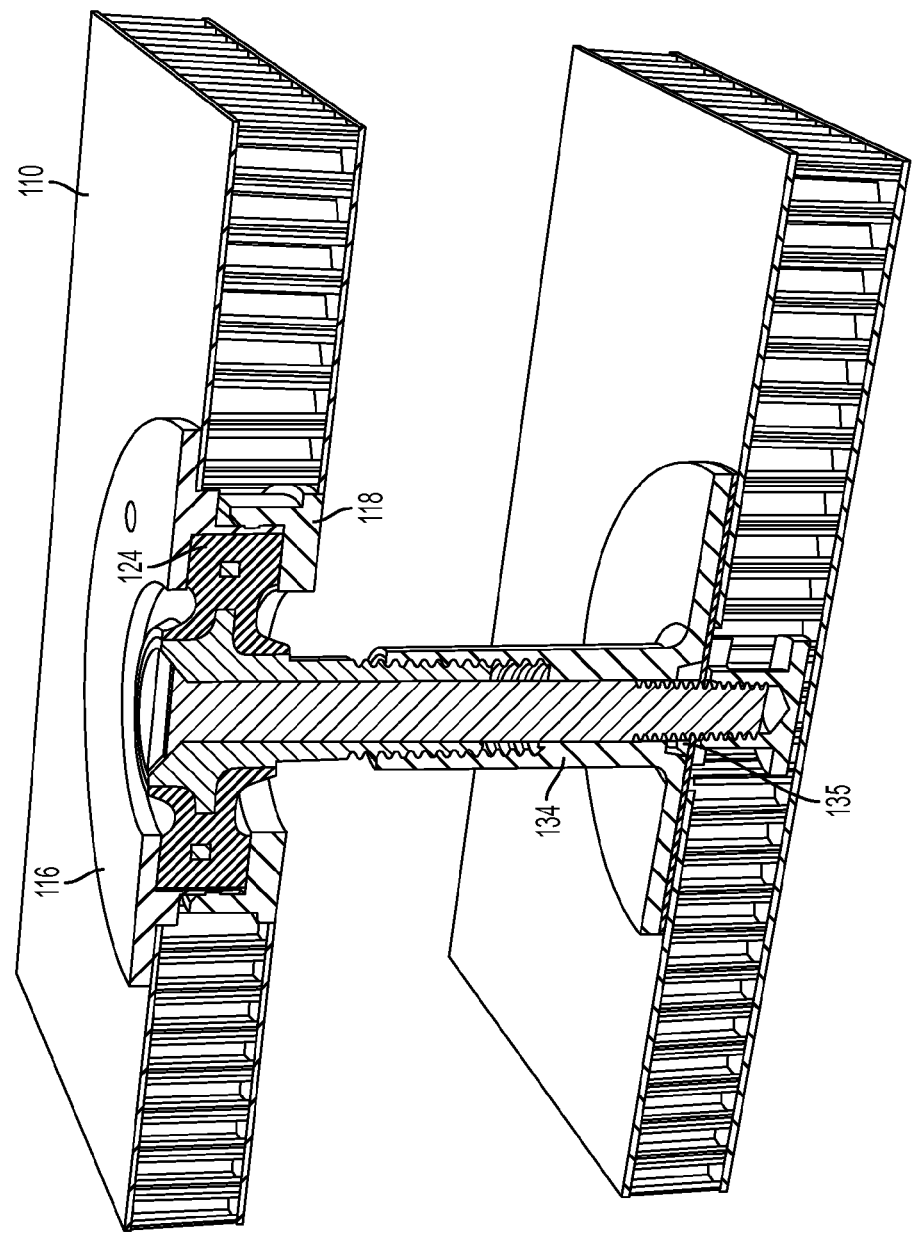
FIG. 3 shows one application of the vibration isolation insert of FIG. 2.

As shown in FIG. 3, two honeycomb panels can also be joined and held in spaced apart relationship using a stand off 134.

Figure 4:
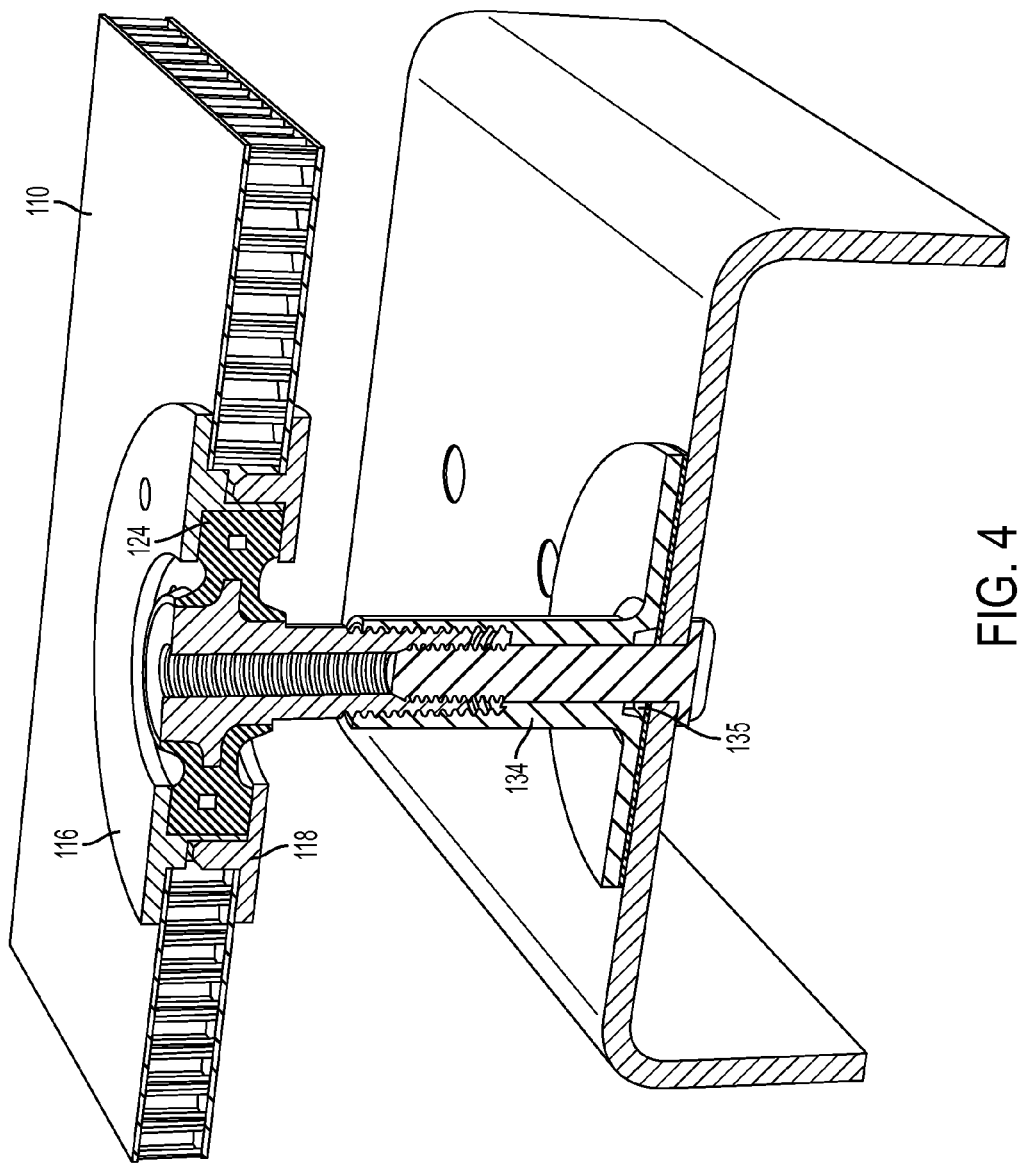
FIG. 4 shows another application of the vibration isolation insert of FIG. 3.

FIG. 4 shows the vibration isolation fastener in a panel used to join to another panel with separation provided by standoff 134.

As shown in FIGS. 3 and 4, the assembly can be secured by anti-rotation hex nut 135.

DETAILED DESCRIPTION OF THE INVENTION

The invention incorporates a vibration isolation insert as a permanent component of the monument, panel, assembly, plate and/or composite panel (hereafter collectively called monument). This insert device is assembled with an internal elastomer with dampening characteristics that can be modulated to accommodate different frequencies. Its various embodiments allow for an infinite number of permutations.

For example, the fastener inserts are used in floor panels to fasten the floor panel to a structural floor track or beam. Other uses are to fasten seats, galleys, overhead lockers, bulkheads, lavatories and the like.

The invention includes an elastomeric part within the fastener insert, to isolate, for example, the floor from structural vibration within the main structural framework of the aircraft and thereby make the passenger compartment more comfortable and pleasing to the passenger.

This invention lends itself to include the development of a family of insert types that will address many applications and uses. This family of inserts may be viewed in two general categories: Potted Isolator Inserts and swaged Isolator Inserts. The Potted Isolator Insert category would typically be installed through a honeycomb panel attached to (or part of) the monument, and would be secured via the application of a potting compound in the panel cavity surrounding the installed insert and possibly via bonding to flanges of components 116 and 118. The swaged Isolator Insert embodiment would typically be installed in a panel attached to (or part of) the monument by crimping its outer flange(s) after the Insert is installed in a receiving hole on the panel. A panel could be a plate, a group of stacked plates or the web of an extrusion of any type of material depending on the application. Honeycomb panels are panels manufactured with two rigid skins and a lightweight core. Generally, honeycomb panels come in many thicknesses and vary in core material, core density, skin materials, skin thickness, and adhesive type.

The installation and application of these inserts include many fastening methods for us with the various fastener types and sizes commonly used in aircraft and other vehicles. The family of Isolator Inserts of this invention will accommodate typical metric and Imperial fastener sizes, and will address derivatives that include studs, through fasteners, threaded fasteners, and additional attachments.

The Potted Isolator Insert category will include, among other embodiments:

1. Adjustable threaded hub w/an assembled outer ring assembly.
2. Adjustable threaded hub w/an un-assembled 2-piece plug/sleeve assembly for adjustability.
3. When addressing bulkhead or vertical panel applications the hub will have bi-directional extensions, extending on opposite directions. These may also be threaded or not internally and externally.
4. Inserts as noted: fully assembled and ready for installation; or an un-assembled insert in three or five parts (i.e., flanges and elastomer bushing/hub assembly) to be assembled and installed by customer.

The swaged Isolator Insert category will include, among other embodiments:

1. Adjustable threaded hub w/an assembled outer ring assembly to be press fit into a panel hole.
2. Adjustable threaded hub w/an un-assembled 2-piece flanges assembly to be press fit or threaded upon installation.
3. Inserts as noted: fully assembled and ready for installation; or an un-assembled insert in three or five parts (i.e., flanges and elastomer bushing/hub assembly) to be assembled and installed by customer.

What is claimed is:

1. A vibration isolation fastener insert adapted to be partially or wholly fixed in a hole in a panel, comprising:
   a rigid generally cylindrical hub having upper and lower longitudinal ends and a radially outward extending annular flange having an outer side surface and opposing upper and lower surfaces, and a central longitudinal through opening adapted to receive a fastener element;
   an annular elastomeric bushing snugly carried or formed around said hub and having an inner annular slot therein receiving and enclosing the outer side surface and upper and lower surfaces of said radially extending flange;
   a first housing having a cylindrical sidewall adapted to axially extend into the hole in said panel, and an annular upper flange extending radially inwardly;
   a second housing having a cylindrical sidewall adapted to axially extend into and adapted to be fixed within the hole in said panel, and an annular lower flange extending radially inwardly;
   said upper and lower flanges each having a central through opening generally aligned with said longitudinal opening;
   the cylindrical sidewall of said first housing being disposed around and receiving a side surface of said bushing, and said upper flange extending radially inwards abutting an upper surface of said bushing; and
   the cylindrical sidewall of said second housing disposed around and receiving an external surface of the cylindrical sidewall of said first housing, and said lower flange extending radially inward abutting a lower surface of said bushing.

2. A panel assembly comprising a panel having a hole, and partially or wholly fixed in said hole a vibration isolation fastener insert comprising:
   a rigid generally cylindrical hub having upper and lower longitudinal ends and a radially outward extending annular flange having an outer side surface and opposing upper and lower surfaces, and a central longitudinal through opening adapted to receive a fastener element;
   an annular elastomeric bushing snugly carried or formed around said hub and having an inner annular slot therein receiving and enclosing the outer side surface and upper and lower surfaces of said radially extending flange;
   a first housing having a cylindrical sidewall axially extending into the hole in said panel, and an annular upper flange extending radially inwardly;
   a second housing having a cylindrical sidewall axially extending into and adapted to be fixed within the hole in said panel, and an annular lower flange extending radially inwardly;
   said upper and lower flanges each having a central through opening generally aligned with said longitudinal opening;
   the cylindrical sidewall of said first housing being disposed around and receiving a side surface of said bushing, and said upper flange extending radially inwards abutting an upper surface of said bushing; and
   the cylindrical sidewall of said second housing disposed around and receiving an external surface of the cylindrical sidewall of said first housing, and said lower flange extending radially inwards abutting a lower surface of said bushing.

3. A vibration isolation fastener insert adapted to be partially or wholly fixed in a hole in a panel, comprising:
- a rigid generally cylindrical hub having upper and lower longitudinal ends and a radially outward extending annular flange having an outer side surface and opposing upper and lower surfaces, and a central longitudinal through opening adapted to receive a fastener element;
- an annular elastomeric bushing snugly carried or formed around said hub and having an inner annular slot therein receiving and enclosing the outer side surface and upper and lower surfaces of said radially extending flange;
- a first housing having a cylindrical sidewall adapted to axially extend into the hole in said panel, and an annular upper flange extending radially inwardly;
- a second housing having a cylindrical sidewall adapted to axially extend into and adapted to be fixed within the hole in said panel, and an annular lower flange extending radially inwardly;
- said upper and lower flanges each having a central through opening generally aligned with said longitudinal opening;
- the cylindrical sidewall of said first housing being disposed around and receiving a side surface of said bushing, and said upper flange extending radially inwards abutting an upper surface of said bushing; and
- the cylindrical sidewall of said second housing disposed around and receiving an external surface of the cylindrical sidewall of said first housing, and said lower flange extending radially inward abutting a lower surface of said bushing and external threads being disposed around the side of said lower housing.

4. A panel assembly comprising a panel having a hole, and partially or wholly fixed in said hole a vibration isolation fastener insert comprising:
- a rigid generally cylindrical hub having upper and lower longitudinal ends and a radially outward extending annular flange having an outer side surface and opposing upper and lower surfaces, and a central longitudinal through opening adapted to receive a fastener element;
- an annular elastomeric bushing snugly carried or formed around said hub and having an inner annular slot therein receiving and enclosing the outer side surface and upper and lower surfaces of said radially extending flange;
- a first housing having a cylindrical sidewall axially extending into the hole in said panel, and an annular upper flange extending radially inwardly;
- a second housing having a cylindrical sidewall axially extending into and adapted to be fixed within the hole in said panel, and an annular lower flange extending radially inwardly;
- said upper and lower flanges each having a central through opening generally aligned with said longitudinal opening;
- the cylindrical sidewall of said first housing being disposed around and receiving a side surface of said bushing, and said upper flange extending radially inwards abutting an upper surface of said bushing; and
- the cylindrical sidewall of said second housing disposed around and receiving an external surface of the cylindrical sidewall of said first housing, and said lower flange extending radially inwards abutting a lower surface of said bushing and external threads being disposed around the side of said lower housing.

\* \* \* \* \*